United States Patent Office 2,784,184
Patented Mar. 5, 1957

2,784,184

ORGANICALLY SOLUBLE STILBYL TRIAZOLE COMPOUNDS

Reinhard Zweidler, Basel, and Ernst Keller, Binningen, Basel Land, Switzerland, assignors to J. R. Geigy A.-G., Basel, Switzerland, a Swiss firm No Drawing. Application October 15, 1954, Serial No. 462,628

Claims priority, application Switzerland October 16, 1953

6 Claims. (Cl. 260—240)

The present invention concerns organically soluble, blue fluorescing 2-(stilbyl-4")-(4.5-arylo)-1.2.3-triazole compounds, the production thereof and their use for the attainment of fluorescent liquid or solid organic solutions and of fluorescent organic material the fluorescence and brighter appearance of which in daylight is due to a slight content of such compounds.

It has been found that 2-(stilbyl-4")-(4.5-arylo)-1.2.3-triazole compounds which contain in the stilbene radical in at least one o-position or in the p-position to the ethylene bridge a sulphonyl substituent which does not dissociate acid in neutral water, have a vivid blue to green-blue fluorescence in organic solution and are therefore valuable agents for the improvement of the appearance of various organic material.

The new triazole compounds are obtained from the corresponding sulphonic acids or salts thereof by chemical conversion of the sulphonic acid groups by methods known per se, the conversion being by way of the sulphonic acid halides into sulphonic acid aryl ester, sulphonic acid amide, sulphonic acid amide organically substituted at the nitrogen atom, aryl sulphonyl or aliphatic sulphonyl groups.

A further production process consists, in the known method for the production of 2-aryl-1.2.3-triazole compounds by oxidation of o-aminoazo dyestuffs, in coupling such diazotised 4-aminostilbene compounds with azo components coupling in the o-position to an amino group which contain in at least one o- or the p-position to the ethylene bridge of the stilbene radical, a sulphonyl substituent —$SO_2R$ which does not dissociate acid in neutral water. Acid groups such as for example the sulphonic acid group, which may have been introduced with the azo component must be chemically converted after the triazole formation by oxidation of the o-aminoazo dyestuff. In the non-acid dissociating sulphonyl substituents of the formula —$SO_2R$, R represents an aryloxy radical, an amino group, an amino group organically substituted at the nitrogen atom, an aryl radical or an aliphatic radical.

In both production processes the aromatic rings of the starting materials can be substituted, with the exception of chromophores such as nitro or arylazo groups and of auxochromic hydroxyl and amino groups, in any manner desired, e. g. by halogen, alkyl, alkoxy, alkylendioxy, aryloxy, phenyl, acylamino, cyano, 4.5-arylo-1,2,3-triazolyl-(2)- or sulphonyl substituents of the type defined above. They can also contain sulphonic acid or carboxyl groups in positions other than those defined above. As explained above however, the acid character of these must be eliminated in some way by chemical conversion in some step of the production process.

The starting material which is chiefly used in the process according to the present invention are 4-aminostilbene compounds which contain a sulphonic acid group or a sulphonyl substituent —$SO_2R$ in at least one o-position or the p-position to the ethylene bridge. Insofar as these compounds are not already known, they can be produced for example according to the methods of Pschorr, Thiele or Meerwein by condensing suitably substituted benzaldehydes and cinnamic acids while splitting off carbon dioxide, condensing 1-methylbenzene compounds negatively substituted in the 2.4-position with suitably substituted benzaldehydes or condensing suitably substituted diazo compounds of the benzene series and cinnamic acids while splitting off carbon dioxide and nitrogen to form the corresponding stilbenes. In each case the two components are so chosen that at least one contains a substituent in the para-position to the coupling point which can be converted into the primary amino group, preferably a nitro group and that at least one of them contains a sulphonic acid group, possibly modified, or a sulphonyl substituent —$SO_2R$ of the type defined above in the ortho- or para-position to the coupling point. Some of the 4-aminostilbene compounds which are chiefly usable in the process according to the present invention as starting materials are, e. g. 4-aminostilbene-2-sulphonic acid, 4-aminostilbene-2'-sulphonic acid, 4-aminostilbene-4'-sulphonic acid, 4-aminostilbene-2.2'-disulphonic acid, the corresponding sulphonic acid phenyl esters, sulphonic acid amides including those organically substituted at the nitrogen atom, the corresponding aryl and alkyl sulphones, whilst all aromatic rings can, as defined above, be further substituted.

The conversion of the sulphonic acid groups, be it in the final 2-stilbyl-4.5-arylo-1.2.3-triazole compound or, for example in a diazo component usable according to this invention in a previous step, e. g. in a 4-nitrostilbene sulphonic acid, is so performed that the free sulphonic acids or the alkali salts thereof are converted with phosphorus halides into the corresponding acid halides. It is advantageous to use phosphorus pentachloride in an amount corresponding to the number of acid groups present and to work in the presence of inorganic or organic inert solvents and diluents such as phosphorus oxychloride, tetrachlorethane, chloro- or nitro-benzene. The acid chlorides so obtained are generally well defined compounds. They are converted by known methods into stable, non-ionogenic sulphonyl groups by, for example, conversion with ammonia or organic primary or secondary amines into the corresponding sulphonic acid amides. For example, methylamine, dimethylamine, ethylamine, diethylamine, n- or iso-propylamine, butylamine, amylamine, dodecylamine, hexadecylamine, octadecylamine, N.N-dimethyl- or diethyl-ethylenediamine, aniline toluidines, xylidines, chloranilines, 4-tert. butylaniline, N-methyl- or ethyl-aniline, N-hydroxyethyl- or dihydroxyproply-aniline, benzylamine, cyclohexylamine, piperidine, morpholine, 1- or 2-aminonaphthalene, aminopyridine, methyl- or ethyl-ethanolamine can be used. The aryl esters are produced by reacting the acid halides with aromatic hydroxyl compounds which are used advantageously in the form of their alkali metal salts, the reaction being performed if necessary in inert solvents and diluents for the sulphonic acid halides. As aromatic hydroxyl compounds, chiefly phenols and naphthols can be used, for example phenol, cresols, xylenols, 4-tert. butyl or 4-tert.

amyl phenol or -o-cresol, 4-iso-octylphenol, 3-nonyl phenol, 2- or 4-hydroxydiphenyl, 4-hydroxydiphenyl methane, 1- or 2-hydroxynaphthalene, 4-tert. butyl-1-hydroxynaphthalene, 6-hydroxy-1.2.3.4-tetrahydronaphthalene can be used. The aryl sulphones according to the present invention are produced by reacting the sulphonic acid halides with aromatic hydrocarbons in the presence of Friedel-Crafts catalysts such as aluminium chloride or ferric chloride, advantageously with aromatic compounds of the benzene series which condense well and which contain non-ionogenic substituents with a positivising action such as methyl or alkoxy groups, e. g. with toluene, o- or m-xylene, anisol or phenetol. The alkyl sulphone compounds or aralkyl sulphone compounds according to this invention are obtained by reduction of the sulphonic acid halides, e. g. with neutral aqueous alkali sulphite or with iron and acid, to form the corresponding sulphinic acids and then alkylation of these compounds. Dimethyl sulphate, diethyl sulphate, ethyl or butyl chloride or bromide, benzyl chloride, glycol chlorohydrin, p-toluene sulphonic acid methyl or ethyl ester can be used as alkylating agent.

In the production of organically soluble 2-(stilbyl-4″)-(4.5-arylo)-1.2.3-triazole compounds according to this invention from diazotised 4-aminostilbene compounds which contain at least one non-acid dissociating sulphonyl substituent —$SO_2R$ in an ortho- or the para-position to the ethylene bridge, the introduction of which is described in the previous paragraph by coupling with azo components coupling in the neighbouring position to an amino group and oxidation of the o-aminoazo dyestuff formed to form the 1.2.3-triazole, the following coupling components for example can be used: 4-chloro- or 4-methyl-2-methoxy-1-aminobenzene, 2-aminonaphthalene, 2-amino-6- or -7-methoxynaphthalene, 2 - aminonaphthalene - 3-carboxylic acid, 2-aminonaphthalene-5- or -6- or -7-sulphonic acid, 2-aminonaphthalene-5.7- or -3.6-disulphonic acid, 1-aminonaphthalene-4- or -5-sulphonic acid, the corresponding aminonaphthalene sulphonic acid amides, -sulphonic acid-mono- and -dialkyl amides, -aralkylamides, -arylamides and -alkylarylamides.

The o-aminoazo dyestuffs are oxidised advantageously in inert organic solution with alkali hypochlorites or with cupric tetramine sulphate. Pyridine bases are particularly good organic solvents.

The new organically soluble triazole compounds correspond to the general formula:

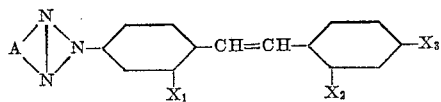

In this formula:

A represents an aromatic radical of the benzene and naphthalene series bound in the neighbouring position to the triazole ring; of $X_1$, $X_2$ and $X_3$ at least one X represents a non-acid dissociating sulphonyl substituent —$SO_2R$, wherein R represents an aryloxy radical, an amino radical, possibly organically substituted, an aryl radical or an aliphatic group, the other X's represent hydrogen and with the exception of chromophores, hydroxyl and amino groups any non-ionogenic substituents desired which may also be in other positions of the aromatic rings.

These new 2-(stilbyl-4″)-(4.5-arylo)-1.2.3-triazole sulphonyl compounds soluble in organic solvents are yellow powders, most of which are insoluble in water but which dissolve more or less well cold or on heating, according to the composition, in the most different organic solvents. The solubility can be easily adapted for the intended use by suitable composition of the sulphonyl substituent. For example, compounds soluble in hydrocarbons and fats are obtained if the sulphamide group contains a higher molecular alkyl or cycloalkyl substituent.

Because of their fluorescence in daylight and in ultra violet light, the new compounds can be used for the most varied purposes, for example for the marking of lubricating oils, for the optical brightening of paraffin, e. g. in the form of candles, fats and waxes. Dissolved in difficultly volatile organic solvents which are used as plasticisers, they can be used as brightening agents in polymeric synthetic materials such as, e. g. polyvinyl chloride, polyacrylonitrile, polyacryl acid esters and copolymers of these compounds, also as light protection agents in cosmetic preparations and ointment bases as well as for other purposes.

The following examples illustrate the invention without limiting it in any way. Where not otherwise stated, parts are given as parts by weight and the temperatures are in degrees centigrade. The relationship of parts by weight to parts by volume is as that of kilogrammes to litres.

EXAMPLE 1

160 parts of phosphorus pentachloride are added to 1000 parts of phosphorus oxychloride and then 226 parts of the sodium salt of 2-(stilbyl-4″)-(naphtho-1′.2′:4.5)-1.2.3-triazole-2″-sulphonic acid are added in small portions within 30 minutes to an hour. The semi-liquid mass is heated and stirred at a temperature of 102–105° for 3 hours. While stirring well, the reaction mass is poured into 2000 parts of water and about 3000 parts of ice in such a way that the temperature does not exceed +5°. After complete decomposition of the phosphoric acid halides, the product which separates is filtered off and washed well with about 5000 parts of water. It is dried at 30–35° in the vacuum until the weight is constant. 2 - (stilbyl-4″) - (naphtho - 1′.2′:4.5) - 1.2.3 - triazole-2″-sulphonic acid chloride is a yellowish powder which melts at 198–200°.

44.5 parts of this sulphonic acid chloride are dissolved in 200 parts of dry nitrobenzene and while warming, 25 parts of phenol are added at a temperature of 55–60°. After stirring for a short time at 55–60° a 30% aqueous solution of 4 parts of sodium hydroxide is added dropwise within half an hour and the whole is stirred for a further 3 hours at 90–95°. Some water is then added and, having a weakly acetic acid reaction, the reaction mixture is distilled with steam until all the nitrobenzene and the excess phenol have been removed. The residue is then allowed to cool, filtered and washed well with water. The raw product is dried in the vacuum at 50–55°. It is purified by recrystallisation from acetic acid ester. 2 - (stilbyl-4″) - (naphtho - 1′.2′:4.5) - 1.2.3-triazole-2″-sulphonic acid phenyl ester is obtained in this way as a yellowish powder which melts at 161–163°. The compound obtained is soluble in many organic solvents such as ethyl acetate, acetone, ethylene glycol monomethyl ether, dimethyl formamide, pyridine, organic acids and their esters and also in plasticisers such as dioctyl phthalate, etc. When dissolved it has a strong fluorescence. It can be used for the brightening of organic substances such as rubber, paraffins, oils, fats and waxes, in particular of synthetic substances such as vinyl and vinylidine polymers, mixed polymers polystyrenes, polyethylenes, etc.

Compounds having similar valuable properties are obtained if
(a) 50 parts of 4-phenyl phenol, 10 parts of dry pyridine and 44.6 parts of 2-(stilbyl-4″)-(naphtho-1′.2′:4.5)-1.2.3-triazole-2″-sulphonic acid chloride are stirred for half an hour at 90–95° and then a 30% aqueous solution of 4 parts of sodium hydroxide is added dropwise within a further half hour. After stirring for 3 hours at 90–95°, the reaction mixture is poured into a solution of 1000 parts of water and 10 parts of sodium hydroxide, the raw product which separates is filtered off and washed with water until it has a neutral reaction. Recrystallised from aqueous ethylene glycol monomethyl ether, 2-(stilbyl-4")-(naphtho-1'.2':4.5)-1.2.3-triazole-2"-sulphonic acid-p-phenyl phenol ester is a yellowish-greenish powder.

(b) 50 parts of p-tert. amyl phenol as described in paragraph (a) are condensed to form 2-(stilbyl-4")-(naphtho-1'.2':4.5)-1.2.3-triazole-2"-sulphonic acid-p-tert. amyl phenol ester. A pale brownish yellow powder is obtained which melts at 177–179°. The product is an active brightening agent for various organic compounds and polymeric synthetic materials.

(c) 50 parts of α- or β-naphthol are condensed according to paragraph (a). 2-(stilbyl-4")-(naphtho-1'.2':4.5)-1.2.3-triazole-2"-sulphonic acid-α-naphthol ester is obtained as a yellowish greyish powder which melts at 211–213°. The corresponding β-naphthol ester is a pale yellow powder which melts at over 300°. In organic compounds, both products have a strong fluorescence and an excellent brightening effect.

EXAMPLE 2

44.6 parts of 2-(stilbyl-4")-(naphtho-1'.2':4.5)-1.2.3-triazole-2"-sulphonic acid chloride according to Example 1 are added at 2–5° to an aqueous solution of 20 parts of dimethyl amine and the whole is stirred overnight. The raw product is filtered off, washed with water and recrystallised from aqueous ethylene glycol monomethyl ether. 2-(stilbyl-4")-(naphtho-1'.2':4.5)-1.2.3-triazole-2"-sulphonic acid dimethyl amide is obtained as a pale yellowish powder. M. P. 180–182°.

If the dimethyl amine is replaced by an aqueous solution of 22 parts ethyl amine, the corresponding sulphonic acid ethyl amide is obtained as a pale yellow powder. M. P. 192–194°.

Both these compounds are valuable brightening agents for oils, fats, waxes and in particular for polymeric synthetic materials.

EXAMPLE 3

44.6 parts of 2-(stilbyl-4")-(naphtho-1'.2':4.5)-1.2.3-triazole-2"-sulphonic acid chloride are dissolved while heating in 200 parts of dry nitrobenzene, 30 parts of di-n-butylamine are added and the whole is stirred for 4 hours at 90–95°. After removing the nitrobenzene and the excess di-n-butylamine, 2-(stilbyl-4")-(naphtho-1'.2':4.5)-1.2.3-triazole-2"-sulphonic acid-di-n-butylamide is obtained. After recrystallisation from aqueous ethylene glycol monomethyl ether, the compound is obtained as a pale brownish-yellow powder. M. P. 130–132°. The product is a valuable brightening agent for organic compounds of the most varied types. Fats, oils, waxes, candle moulding mixtures as well as polymeric synthetic materials can be named.

If in this example the di-n-butylamine is replaced by 25 parts of diethanolamine, 20 parts of ethylene diamine, 20 parts of morpholine, 20 parts of 2-aminopyridine or 20 parts of piperidine, then the corresponding Sulfonic acid diethanolamide, a pale yellow powder melting at 167–169°,
Sulphonic acid aminoethylamide, a pale yellow powder melting at 174–176°,
Sulphonic acid morpholide, a pale yellow powder melting at 228–230°,
Sulphonic acid-2-pyridylamide, a pale yellow powder melting at over 300°,
Sulphonic acid piperidide, a pale yellow powder melting at 176–178°, is obtained. These are also suitable as brightening agents for vinyl polymers.

If 20 parts of dodecylamine are condensed according to the above example in the presence of 10 parts of pyridine, then 2-(stilbyl-4")-(naphtho-1'.2':4.5)-1.2.3-triazole-2"-sulphonic acid dodecyl amide is obtained as a pale olive-yellow powder. M. P. 158–160°. This compound is particularly suitable for the optical brightening of oils, fats, waxes, and candle moulding mixtures.

EXAMPLE 4

44.6 parts of 2-(stilbyl-4")-(naphtho-1'.2':4.5)-1.2.3-triazole-2"-sulphonic acid chloride are suspended in 200 parts of dry toluene and 25 parts of cyclohexylamine are added while stirring well. The exothermic reaction causes the temperature to rise to 50–60°. On completion of the reaction the whole is heated for 3 hours at 90–95°. Some water and sodium carbonate are added and the toluene and excess cyclohexylamine are distilled off with steam from the reaction mixture which has a clear alkaline reaction to brilliant yellow paper. The residue is cooled, filtered off, washed well with water and dried in the vacuum at 50–55°. 2-(stilbyl-4")-(naphtho-1'.2':4.5)-1.2.3-triazole-2"-sulphonic acid cyclohexylamide is a pale yellowish powder which melts at 182–184°. The product is soluble in many organic compounds, in particular in solvents and plasticisers such as dialkyl phthalates and sebacates, phosphoric acid aryl esters and when so dissolved it has a strong fluorescence. It is a valuable brightening agent for the most varied organic substances such as rubber, paraffins, waxes, fats, in particular vinyl or vinylidene polymers and mixed polymers, polystyrenes and polyethylenes.

If 44.6 parts of 2-(stilbyl-4")-(naphtho-1'.2':4.5)-1.2.3-triazole-2"-sulphonic acid chloride are dissolved in 200 parts of abs. nitrobenzene in the warm and reacted in the presence of 10 parts of pyridine with 12 parts of benzylamine, then after removing the nitrobenzene and the excess amine from the reaction mixture which has an alkaline reaction to brilliant yellow paper by steam distillation, 2-(stilbyl-4")-(naphtho-1'.2':4.5)-1.2.3-triazole-2"-sulphonic acid benzylamide is obtained. The product is a pale brownish yellow powder which, after recrystallisation, melts at 185–187°. It has similar interesting properties to the compound described above and can also be used for the brightening of organic compounds of the most varied kinds.

If the benzylamine is replaced by 10 parts of aniline or 15 parts of 1-aminonaphthalene, the corresponding sulphonic acid anilide, a pale yellowish powder (M. P. 207–109°) or the sulphonic acid-1-naphthylamide, a pale yellowish powder (M. P. 195–197°) is obtained. Both products have very good brightening properties.

EXAMPLE 5

137 parts of the disodium salt of 2-(stilbyl-4")-(naphtho-1'.2':4.5)-1,2,3-triazole-2".5'-disulphonic acid are added to a mixture of 160 parts of phosphorus pentachloride and 1000 parts of phosphorus oxychloride. The temperature is then kept for 4 hours at 102–105° and then the whole is poured into a mixture of 2000 parts of water and about 3000 parts of ice, and stirred until the phosphoric acid halide is completely decomposed. The product is filtered off, washed well with water and the substance obtained is dried in the vacuum at 30–35°. 2 - (stilbyl - 4") - (naptho - 1'.2':4.5)-1.2.3 - triazole - 2".5' - disulphonic acid chloride is a yellow powder which melts at 197–199°.

54.6 parts of this disulphonic acid chloride are heated in 600 parts of dry nitrobenzene to a temperature of 90–95°. 50 parts of phenol are added to the yellow suspension and a 30% aqueous solution of 8 parts of sodium hydroxide is added within half an hour at a temperature of 90–95°. The temperature is kept at 90–95° for another 3 hours and, after adding water, the nitrobenzene and the excess phenol are distilled off with steam from the reaction mixture which has a weak acetic acid reaction. The raw product obtained is dissolved in boiling ethylene glycol monomethyl ether, precipitated by the addition of water and dried in the vacuum at 50–55°. The 2 - (stilbyl - 4″) - (naphtho - 1′.2′:4.5) - 1.2.3 - triazole-2″.5′-disulphonic acid phenyl ester is a pale greyish-yellowish powder which melts at 148–150°. This compound is a valuable brightening agent for the most varied types of polymeric synthetic materials such as polystyrenes, polyethylenes, vinyl and vinylidene polymers as well as copolymers.

A compound with a similar activity is obtained if in the above example the phenol is replaced by 60 parts of p-tert. amylphenol. 2-(stilbyl-4″)-(naphtho-1′.2:4.5)-1.2.3 - triazole - 2″.5′ - disulphonic acid - p - tert. amyl phenol ester is a pale brownish-yellow powder which melts at 191–193°. In addition, this compound is suitable for the brightening of fats, waxes and candle moulding mixtures.

If in the first paragraph of the above example, the 2 - (stilbyl - 4″) - (naphtho - 1′.2′:4.5) - 1.2.3 - triazole-2″.5′-disulphonic acid is replaced by the corresponding -2″.6′-disulphonic acid and the disulphonic acid chloride obtained is condensed as described above with 50 parts of phenol, then 2 - (stilbyl - 4″) - (naphtho-1′.2′:4.5) - 1.2.3 - triazole - 2″.6′ - disulphonic acid phenyl ester is obtained as a pale yellow powder which melts at 221–223°. The product is a valuable brightening agent for polymeric synthetic materials of the most varied kinds.

The phenol can also be replaced by 66 parts of β-naphthol. 2 - (stilbyl - 4″) - (naphtho - 1′.2′:4.5) - 1.2.3-triazole-2″.6′-disulphonic acid-β-naphthol ester is obtained as an ochre yellow powder which melts at 168–170°.

EXAMPLE 6

54.6 parts of 2-(stilbyl-4″)-(naphtho-1′.2′:4.5)-1.2.3-triazole-2″.5′-disulphonic acid chloride, obtained according to Example 5, are warmed in 400 parts of dry nitrobenzene and 60 parts of di-n-butylamine are added. The whole is stirred for 3 hours at a temperature of 90–95° and after adding some water, the nitrobenzene and the excess di-n-butylamine are distilled off with steam from the reaction mixture which has an alkaline reaction to brilliant yellow paper. The raw product is dissolved in hot ethylene glycol monomethyl ether and precipitated with water. 2 - (stilbyl - 4″) - (naphtho - 1′.2′:4.5)-1.2.3 - triazole - 2″.5′ - disulphonic acid-bis-di-n-butyl amide is obtained as a yellow powder which melts at 91–93°. The compound is a valuable brightening agent for fats, waxes, candle moulding mixtures as well as for polymeric synthetic materials.

If the 2 - (stilbyl - 4″) - (naphtho - 1′.2′:4.5) - 1.2.3-triazole-2″.5′-disulphonic acid chloride is replaced by 54.6 parts of the corresponding 2″.6′-disulphonic acid chloride, then 2 - (stilbyl - 4″) - (naphtho - 1′.2′:4.5) 1.2.3 - triazole - 2″.6′ - disulphonic acid - bis - di - n-butyl-amide is obtained as a pale weak brownish-yellow powder which melts at 114–116°. This compound is also a valuable brightening agent for organic compounds of the most varied type.

Compounds with similar properties are obtained if the di-n-butylamine is replaced by 50 parts of cyclohexylamine, 39 parts of dodecylamine, 44 parts of benzylamine or 40 parts of aniline, the condensation being performed if necessary in 10 parts of pyridine. In this way are obtained the corresponding 2″.5′- or 2″.6′-disulphonic acid amides:

2″.5′-biscyclohexylamide; a yellowish powder, M. P. 145–147°,
2″.6′ - biscyclohexylamide; a yellowish powder, M. P. 182–184°,
2″.6′ - bisdodecylamide; a yellowish powder, M. P. 179–181°,
2″.6′ - bisbenzylamide; a yellowish powder, M. P. 165–167°,
2″.6′-bisphenylamide; a yellowish powder, M. P. 246–248°.

EXAMPLE 7

133 parts of the disodium salt of 2-(stilbyl-4″)-(naphtho - 1′.2′:4.5) - 1.2.3 - triazole - 3′ - carboxylic acid-2″-sulphonic acid are treated with 160 parts of phosphorus pentachloride in 1000 parts of phosphorus oxychloride according to the first paragraph of Example 5. The di-acid chloride is obtained which melts at 186–188°.

52.8 parts of 2 - (stilbyl - 4″) - (naphtho - 1′.2′:4.5)-1.2.3-triazole-3′-carboxylic acid chloride - 2″ - sulphonic acid chloride are heated to 90–95° with 400 parts of dry pyridine, 50 parts of phenol are added and a 30% aqueous solution of 8 parts of sodium hydroxide is added within half an hour. The temperature is kept at 90–95° for 4 hours and after the addition of some water, the nitrobenzene and the excess phenol are distilled off with steam from the reaction mixture which has a weak acetic acid reaction. The raw product is dissolved in hot ethylene glycol monomethyl ether, after cooling it is precipitated by the addition of water, filtered off and dried in the vacuum. A yellowish powder (M. P. 175–177°) is obtained. The product probably has the constitution of 2 - (stilbyl - 4″) - (3′ - carboxy - naphtho-1′.2′:4.5) - 1.2.3 - triazole - 2″ - sulfonic acid phenyl ester. It is an excellent brightening agent for various polymeric synthetic materials such as polymers of vinyl chloride, vinylidene chloride, of copolymers, polystyrenes, polyethylenes, etc., fats, waxes and oils.

If on the other hand, 52.8 parts of 2-(stilbyl-4″)-(naphtho - 1′.2′:4.5) - 1.2.3 - triazole - 3′ - carboxylic acid chloride 2″-sulphonic acid chloride are added under exterior cooling to an aqueous solution of 30 parts of ethylamine and the whole is stirred overnight at room temperature, then 2 - (stilbyl - 4″) - (naphtho - 1′.2′:4.5) 1.2.3 - triazole - 3′ - carboxy - ethylamide - 2″ - sulphonic acid ethylamide is obtained as a yellowish powder, M. P. 128–130°. This compound is a valuable brightening agent for organic compounds, particularly polymeric synthetic materials of the most varied kinds.

A product with similar properties is obtained if 52.8 parts of 2-(stilbyl-4″)-(naphtho-1′.2′:4.5)-1.2.3-triazole-3′-carboxylic acid chloride-2″-sulphonic acid chloride in 400 parts of dry nitrozenzene is reacted with 40 parts of cyclohexylamine for 4 hours at a temperature of 90–95°. After the nitrobenzene and the excess cyclohexylamine have been distilled off with steam from the reaction mixture which has an alkaline reaction to brilliant yellow paper, 2-(stilbyl-4″)-(naphtho-1′.2′:4.5)-1.2.3 - triazole-3′ - carboxycyclohexylamide - 2″ - sulphonic acid cyclohexylamide is obtained. This compound is a yellow powder and decomposes at temperatures of over 300°.

Also the cyclohexylamine can be replaced by 40 parts of aniline. The 2-(stilbyl-4″)-(naphtho-1′.2′:4.5)-1.2.3-triazole-3′-carboxy-anilide-2″-sulphonic acid anilide so obtained is a yellowish powder which melts at 138–140°. Also these acid amides are brightening agents for polymeric synthetic materials.

EXAMPLE 8

44 parts of 6-methyl-5-methoxy-2-(stilbyl-4′)-1.2.3-benztriazole-2′-sulphonic acid chloride (M. P. 191–193° produced according to the first paragraph of Example 1 from 221 parts of the sodium salt of 6-methyl-5-methoxy-2-(stilbyl-4′)-1.2.3-benztriazole-2′-sulphonic acid in 1000 parts of phosphorus oxychloride with 160 parts of phosphorus pentachloride), in 200 parts of dry nitrobenzene are reacted for 4 hours at 90–95° with 25 parts of phenol. During the reaction a 30% aqueous solution of 4 parts of sodium hydroxide is added. After removing the nitrobenzene and the excess phenols by steam distillation of the reaction mixture which has a weak acetic acid reaction, the 6-methyl-5-methoxy-2-(stilbyl-4')-1.2.3-benztriazole-2'-sulphonic acid phenyl ester is obtained as a yellowish powder which melts at 184–186°.

The compound can be used for brightening the most varied types of organic substances. Waxes, fats, oils as well as polymeric synthetic materials such as polyvinyl chloride, polyvinylidene chloride, copolymers, polystyrenes, polyacrylic acid ester, etc. can be named.

A compound with very similar properties is obtained if the 44 parts of 6-methyl-5-methoxy-2-(stilbyl-4')-1.2.3-benztriazole-2'-sulphonic acid chloride is reacted in 200 parts of dry nitrobenzene with 25 parts of cyclohexylamine. When recrystallised 6-methyl-5-methoxy-2-(stilbyl-4')-1.2.3-benztriazole-2'-sulphonic acid cyclohexylamide is a yellowish powder which melts at 206–208°.

EXAMPLE 9

164 parts of the sodium salt of 4-nitrostilbene-2-sulphonic acid are added to a mixture of 1000 parts of phosphorus oxychloride and 160 parts of phosphorus pentachloride. On completion of the addition, the whole is stirred for 3 hours at a temperature of 102–105°. The reaction mixture is added to 2000 parts of water and about 3000 parts of ice in such a manner that the temperature does not exceed +5°. After the phosphoric acid halides have completely decomposed, the precipitated product is filtered off and washed well with water. After drying in the vacuum at 30–35°, 4-nitrostilbene-2-sulphonic acid chloride is a yellow powder which melts at 185–187°. 32.4 parts of 4-nitrostilbene-2-sulphonic acid chloride are warmed in 200 parts of nitrobenzene with 30 parts of di-n-butylamine for 4 hours at 90–95° and, after the addition of water and soda, the excess dibutylamine and the nitrobenzene are distilled off with steam from the reaction mixture which has an alkaline reaction to brilliant yellow paper. The 4-nitrostilbene-2-sulphonic acid-di-n-butylamide is obtained as a yellowish powder. It melts after recrystallisation from alcohol, at 120–122°.

If the di-n-butylamine is replaced by 12 parts of aniline and 15 parts of pyridine, then 4-nitrostilbene-2-sulphonic acid anilide is obtained as a yellowish powder which melts at 200–202°.

41.7 parts of 4-nitrostilbene-2-sulphonic acid di-n-butylamide are reduced according to Béchamp with 30 parts of corroded cast iron filings in a mixture of water and ethylene glycol monomethyl ether to form the 4-aminostilbene-2-sulphonic acid-di-n-butylamide. This compound is a viscous orange-yellow oil.

If the 4-nitrostilbene-2-sulphonic acid-di-n-butylamide is replaced by 38 parts of 4-nitrostilbene-2-sulphonic acid anilide, then 4-aminostilbene-2-sulphonic acid anilide is obtained as a pale yellow powder which melts at 68–70°.

38.7 parts of 4-aminostilbene-2-sulphonic acid-di-n-butylamide are dissolved in 200 parts of glacial acetic acid, 25 parts of a 30% hydrochloric acid are added and the whole is diazotised at 8–10° with an aqueous solution of 6.9 parts of sodium nitrite. The diazo compound obtained is coupled with an aqueous solution containing 11 parts of a 30% hydrochloric acid and 14.3 parts of β-naphthylamine and the reaction of the suspension is neutralised by the addition of sodium acetate until Congo red paper no longer turns blue. On completion of the coupling the o-aminoazo dyestuff is filtered off and dissolved, in a damp condition, in 500 parts of pyridine. The o-aminoazo dyestuff is oxidised to form the triazole compound by the addition of a mixture of 60 parts of crystallised copper sulphate in 240 parts of water and 120 parts of 25% ammonia. The temperature is kept at 90–95° until the o-aminoazo dyestuff has completely disappeared. The whole is cooled, 50 parts of sodium chloride are added, the pyridine layer containing the triazole is separated and washed several times with saturated sodium chloride solution while adding a little concentrated ammonia in order to remove the copper salts. The pyridine is then removed with steam, the raw product which remains is dissolved in boiling ethylene glycol monomethyl ether and, after cooling, is precipitated with water and dried. 2-(stilbyl-4'')-(naphtho-1'.2':4.5)-1.2.3-triazole-2''-sulphonic acid-di-n-butylamide so obtained melts at 129–131° and is identical with the product obtained according to Example 3.

If the 4-aminostilbene-2-sulphonic acid-di-n-butylamide is replaced by 35 parts of 4-aminostilbene-2-sulphonic acid anilide, then 2-(stilbyl-4'')-(naptho-1'.2':4.5)-1.2.3-triazole-2''-sulphonic acid anilide is obtained. The product obtained is identical with the compound described in Example 4.

EXAMPLE 10

100 parts of zinc dust are heated with 100 parts of ethyl alcohol and 100 parts of ethylene glycol monomethyl ether at 75–78° and 44.6 parts of 2-(stilbyl-4'')-(naphtho-1'.2':4.5)-1.2.3-triazole-2''-sulphonic acid chloride is added in small portions. The reaction mixture is gently boiled under reflux for one hour, a 15% aqueous solution of 12 parts of calcinated sodium carbonate is then added, the whole is filtered hot, a 30% aqueous solution of 6 parts of sodium hydroxide is added at 40–42° to the filtrate and 15 parts of dimethyl sulphate are added dropwise within half an hour. The temperature is then kept at 40–42° for a further half hour and then the solution is poured into 600 parts of a 10% sodium chloride solution. The precipitated product is filtered off and dried. 2-(stilbyl-4'')-(naphtho-1'.2':4.5)-1.2.3-triazole-2''-methyl sulphone is a yellowish powder. A recrystallised sample melts at 141–143°.

This compound is an interesting brightening agent for fats, waxes, oils and various organic polymerisation products.

EXAMPLE 11

118 parts of 4-nitrotoluene-2-sulphonic acid chloride are heated under reflux with 400 parts of m-xylene and 10 parts of ferric chloride until the hydrochloric acid is completely split off. The excess m-xylene is separated from the 3-nitro-6.2'.4'-trimethyl-1.1'-diphenyl sulphone by steam distillation. The compound is a greyish powder and recrystallised from alcohol, melts at 92–94°.

71 parts of 3-nitro-6.2'.4'-trimethyl-1.1'-diphenyl sulphone are condensed with 25 parts of benzaldehyde while adding 2 parts of piperidine to form 4-nitrostilbene-2-(1'.3'-dimethylphenyl sulphone). After recrystallisation from glacial acetic acid this compound is obtained in yellow crystals which melt at 191–193°.

39.3 parts of 4-nitrostilbene-2-(1'.3'-dimethylphenyl sulphone) are reduced in a mixture of ethylene glycol monomethyl ether and water with 30 parts of corroded cast iron filings according to Béchamp. 4-aminostilbene-2-(1'.3'-dimethylphenyl sulphone) is obtained as a yellowish powder. Recrystallised from a benzene-benzine mixture, it melts at 138–140°.

36.3 parts of this amino compound are dissolved in 200 parts of glacial acetic acid, a mixture of 25 parts of 30% hydrochloric acid and 100 parts of water is added and the whole is diazotised with a concentrated solution of 6.9 parts of sodium nitrite at 8–10°. The diazo compound obtained is coupled with an aqueous solution containing 11 parts of 30% hydrochloric acid and 14.3 parts of β-naphthylamine and the strongly mineral acid reaction is neutralised by the addition of sodium acetate. On completion of the coupling, the o-aminoazo dystuff is isolated and then, as described in Example 9, dissolved in pyridine and oxidised to form the triazole compound with copper sulphate and ammonia. 2-(stilbyl-4″)-(naphtho-1′.2′:4.5) - triazole-2″-(1.3-dimethylphenyl sulphone) is obtained as a pale yellowish powder which melts at 215-217°.

In organic compounds the product has a strong brightening effect; it can be used for the brightening of polymeric synthetic materials such as polyvinyl chloride, polyacrylonitrile and copolymers. It is also suitable for brightening waxes, fats and oils.

If in the above example p-toluene is used instead of m-xylene and otherwise the same procedure is followed, then 2 - (stilbyl-4″)-naphtho-1′.2′:4.5)-1.2.3-triazole-2″-(4-methylphenyl sulphone) is obtained as a yellow powder.

EXAMPLE 12

50.6 parts of 2-(3″′.4″′-dimethoxy-stilbyl-4″)-(naphtho - 1′.2′:4.5) - 1.2.3-triazole-2″-sulphonic acid chloride (produced according to paragraph 1 of Example 1 from 255 parts of the sodium salt of 2-(3″′.4″′-dimethoxy-stilbyl-4″)-(naphtho-1′.2′:4.5)-1.2.3-triazole-2″-sulphonic acid in 1000 parts of phosphorus oxychloride with 160 parts of phosphorus pentachloride) in 100 parts of toluene are stirred for 4 hours at a temperature of 90-95° with 30 parts of di-n-butylamine. After removal of the toluene and the excess di-n-butylamine, 2-(3″′.4″′-dimethoxy-stilbyl-4″)-(naphtho-1′.2′:4.5)-1.2.3-triazole-2″- sulphonic acid-di-n-butylamide is obtained. After recrystallisation from aqueous dimethyl formamide the product is obtained as a yellow powder which melts at 170-172°. This compound is a valuable brightening agent for organic compounds of the most varied type, in particular for polymeric synthetic materials. The fluorescence which in comparison with that of the product named in Example 1 has clearly shifted towards green makes the product specially suitable for the brightening of polystyrenes, etc.

A compound with very similar properties is obtained if in the above example the di-n-butylamine is replaced by 25 parts of cyclohexylamine. 2-(3″′.4″′-dimethoxy-stilbyl-4″) - (naphtho-1′.2′:4.5)-1.2.3-triazole-2″-sulfonic acid cyclohexylamide is a yellow powder which melts at 176-178°.

Also the 2 - (3″′.4″′-dimethoxy-stilbyl-4″)-(naphtho-1′.2′:4.5)-1.2.3-triazole-2″-sulphonic acid chloride can be replaced by 50.6 parts of 2-(2″′.3″′-dimethoxy-stilbyl-4″) - (naphtho-1′.2′:4.5)-1.2.3-triazole-2″-sulphonic acid chloride. By reacting with 25 parts of cyclohexylamine as described above, 2-(2″′.3″′-dimethoxy-stilbyl-4″)-(naphtho-1′.2′:4.5)-1.2.3-triazole-2″-sulphonic acid cyclohexylamide is obtained and by reacting with 30 parts of di-n-butylamine 2-(2″′.3″′-dimethoxy-stilbyl-4″)-(naphtho-1′.2′:4.5)-1.2.3-triazole-2″-sulphonic acid di-n-butylamide is obtained. Both are in the form of yellow powders. The two last named compounds are valuable brightening agents for polymeric synthetic materials of the most varied type, in particular for polystyrenes, polyacrylic acid esters and polyvinyl chloride.

Compounds with a less green-blue nuance are obtained if 2-(3″′.4″′-dimethoxy-stilbyl-4″)-(naphtho-1′.2′:4.5)-1.2.3-triazole-2″-sulphonic acid chloride is replaced by 53.8 parts of 2 - (4″′ - phenoxy - stilbyl - 4″) - (naphtho-1′.2′:4.5)-1.2.3-triazole-2″-sulphonic acid chloride. On reacting with 25 parts of cyclohexylamine, 2-(4″′-phenoxy - stilbyl - 4″) - (naphtho - 1′.2′:4.5) - 1.2.3 - triazole-2″-sulphonic acid cyclohexylamide is obtained as a yellow powder which melts at 153-155°. If the cyclohexylamine is replaced by 30 parts of di-n-butylamine, then 2 - (4″′ - phenoxy - stilbyl - 4″) - (naphtho - 1′.2′:4.5)-1.2.3-triazole-2″-sulphonic acid-di-n-butylamide is obtained as a pale yellow powder which melts at 102-104°. Both products are suitable for the brightening of the most varied types of organic compounds, of which can be named: waxes, fats as well as polymeric synthetic materials such as polyvinyl chloride, polyvinylidene chloride, copolymers, polystyrene, polyacrylic acid ester.

EXAMPLE 13

30.2 parts of 4-aminostilbene-2′-sulphonic acid dimethylamide are dissolved in 100 parts of glacial acetic acid with 25 parts of concentrated hydrochloric acid, 80 parts of ice are added and the whole is diazotised at 10-12° with an aqueous solution of 6.9 parts of sodium nitrite. The diazo compound obtained is then coupled with a solution of 14.3 parts of 2-aminonaphthalene and 10 parts of concentrated hydrochloric acid in 250 parts of water at a temperature of 12-15°. The strong mineral acid reaction of the mixture is neutralised by the gradual addition of 40 parts of crystallised sodium acetate. On completion of the coupling the o-aminoazo dyestuff is filtered off and washed. The dyestuff is then dissolved in 300 parts of hot pyridine and a mixture of 60 parts of crystallised copper sulphate in 240 parts of water and 120 parts of concentrated ammonia are added and the whole is then stirred at a temperature of 90-95° until the oxidation of the dyestuff is complete. After cooling, the aqueous layer containing the copper salts is separated from the pyridine while adding sodium chloride, the pyridine layer is washed several times with sodium chloride solution containing ammonia and then, while adding 5 parts of sodium hydroxide and 2-5 parts of sodium hydrosulphite, the pyridine is distilled off with steam. The product is further purified by dissolving it in hot dimethyl formamide, filtering hot while adding some animal charcoal and the filtrate is poured into four or five times its volume of about a 10% sodium chloride solution. The precipitated product is filtered off, washed well with water and dried in the vacuum. 2-(stilbyl-4″)-(naphtho-1′.2′:4.5)-1.2.3-triazole-2″′-sulphonic acid dimethylamide is obtained as a brownish-yellow powder which melts at 136-138°.

The compound obtained is soluble in many organic solvents such as acetic acid ester, chlorobenzene, ethylene glycol monomethyl ether, dimethyl formamide, further in plasticisers such as dioctyl phthalate, etc. When so dissolved it has a strong fluorescence. It can be used for the brightening of the most varied types of organic materials such as rubber, paraffines, oils, fats and waxes, in particular of synthetic materials such as polyvinyl chloride, polyacrylonitrile, copolymers, etc.

A compound with similar properties is obtained if in the above example the 4 - aminostilbene - 2′ - sulphonic acid dimethyl amide is replaced by 35.6 parts of 4-aminostilbene-2′-sulphonic acid cyclohexylamide. The 2 - (stilbyl - 4″) - (naphtho - 1′.2′:4.5) - 1.2.3-triazole - 2″′-sulphonic acid cyclohexylamide so obtained is a brownish-yellow powder which melts at 168-170°.

Also the 4-aminostilbene-2′-sulphonic acid dimethylamide can be replaced by 38.6 parts of 4-aminostilbene-2′-sulphonic acid-di-n-butylamide or by 34.4 parts of 4-aminostilbene-2′-sulphonic acid morpholide. By reacting the diazo compounds with 2-aminonaphthalene and oxidising the o-aminoazo dyestuffs to form the triazole compounds as described above, 2-(stilbyl-4″)-(naphtho-1′.2′:4.5)-1.2.3-triazole-2″′-sulphonic acid-di-n-butylamide, or -2″′-sulphonic acid morpholide are obtained as brownish-yellow powders. The two products have a strong brightening effect in the most varied organic compounds, in particular they are suitable for the brightening of polymeric synthetic materials such as polyvinyl chloride, polyacrylonitrile and copolymers.

The 4-aminostilbene-2′-sulphonic acid dimethylamide used in the above example is produced in the following way: 32.7 parts of the sodium salt of 4-nitrostilbene-2'-sulphonic acid are added to a mixture of 200 parts of phosphorus oxychloride and 40 parts of phosphorus pentachloride and the whole is stirred for 4 hours at a temperature of 102–105°. The phosphorus acid halides are decomposed by pouring the reaction mixture into ice and water at a temperature of under 5°. The precipitated 4-nitrostilbene-2'-sulphonic acid chloride is filtered off, washed well with water and dried in the vacuum at a temperature of 30–35°.

32.4 parts of 4-nitrostilbene-2'-sulphonic acid chloride are added at a temperature of 0–5° to 100 parts of about a 23% aqueous dimethylamine solution. The whole is then stirred for some hours at 0–5° and finally for 1 hour at 40–50°. After cooling, the precipitate is filtered off and washed well with cold water. The product so obtained is then reduced according to the Béchamp process with 30 parts of cast iron filings in the presence of 5 parts of hydrochloric acid in a mixture of ethylene glycol monomethyl ether and water. 4-aminostilbene-2'-sulphonic acid dimethylamide is obtained as a pale yellowish powder. Recrystallised from benzene, it melts at 121–123°.

EXAMPLE 14

35.1 parts of 4-aminostilbene-2'-sulphonic acid phenyl ester are dissolved in 120 parts of glacial acetic acid with the addition of 25 parts of concentrated hydrochloric acid and, after the further addition of 50 parts of ice, it is diazotised at a temperature of 10–12° with an aqueous solution of 6.9 parts of sodium nitrite. The diazo compound obtained is coupled at 12–15° with an aqueous solution of 14.3 parts of 2-aminonaphthalene and 10 parts of concentrated hydrochloric acid. The reaction is kept in the weak mineral acid range by the gradual addition of an aqueous solution of about 40 parts of crystallised sodium acetate. On completion of the coupling, the dyestuff is filtered off and washed well with water. The damp o-aminoazo dyestuff is dissolved at a temperature of 90–95° in hot pyridine and mixture of 60 parts of crystallised copper sulphate in 240 parts of water and 120 parts of concentrated ammonia is added. The whole is stirred at a temperature of 90–95° until the oxidation of the dyestuff is complete. After cooling, the aqueous copper-containing layer is separated from the pyridine while adding sodium chloride, the pyridine is washed several times with ammoniacal sodium chloride solution and then the pyridine, with the addition of 2–5 parts of sodium hydrosulphite, is distilled off with steam. The raw product is further purified by dissolving it in hot dimethyl formamide and filtering hot with the addition of some animal charcoal. The filtrate is then poured into four or five times its volume of about a 10% sodium chloride solution, the precipitated product is filtered off, washed well with water and dried in the vacuum. 2-(stilbyl-4'')-(naphtho-1'.2':4.5)-1.2.3-triazole-2'''-sulphonic acid phenyl ester is obtained as a yellowish powder which melts at 157–159°.

In the most varied organic compounds the product has a strong fluorescence. It can be used for the brightening of polymeric synthetic materials such as polyvinyl chloride, polyvinylidene chloride, polyacrylonitrile and copolymers as well as polystyrenes. Also the product is suitable for the brightening of waxes, fats and oils.

A product with a similar action is obtained if in the above example instead of 4-aminostilbene-2'-sulphonic acid phenyl ester, 36.5 parts of 4-aminostilbene-2'-sulphonic acid-p-cresyl ester is used. 2-(stilbyl-4'')-(naphthol-1'.2':4.5)-1.2.3-triazole-2''' sulphonic acid-p-cresyl ester is also a yellowish powder.

Also the 4-aminostilbene-2'-sulphonic acid phenyl ester can be replaced by 27.3 parts of 4-aminostilbene-2'-methyl sulphone. By reacting the diazo compound obtained with 2-aminonaphthalene to form the o-aminoazo dyestuff and oxidising to form the triazole compound as described above, 2 - (stilbyl - 4'') - (naphtho - 1'.2':4.5) - 1.2.3 - triazole-2'''-methyl sulphone is obtained as a yellowish powder which melts at over 300°.

This compound is an interesting brightening agent for fats, waxes, oils and various organic polymerisation products.

A similarly active product is obtained if the 4-aminostilbene-2'-methyl sulphone is replaced by 31.5 parts of 4 - aminostilbene - 2' - n - butyl sulphone. 2 - (stilbyl - 4'') - (naphtho - 1'.2':4.5) - 1.2.3 - triazole - 2''' - n - butyl sulphone is a yellow powder.

4-aminostilbene-2'-sulphonic acid phenyl ester is obtained as follows:

32.4 parts of 4-nitrostilbene-2'-sulphonic acid chloride are slowly added at a temperature of 60–65° to a mixture of 10 parts of phenol, 4.5 parts of sodium hydroxide and 20 parts of water, the reaction being alkaline to phenolphthalein. The whole is stirred for 1 hour at 60–65°, then cooled, the precipitate is filtered off and washed well with water. After drying in the vacuum, 4-nitrostilbene-2'-sulphonic acid phenyl ester is a brownish powder.

35.1 parts of this 4-nitrostilbene-2'-sulphonic acid phenyl ester are reduced according to the Béchamp process with 30 parts of etched cast iron filings in a mixture of ethylene glycol monomethyl ether and water. 4-aminostilbene-2'-sulphonic acid phenyl ester is obtained as a yellowish, resinous mass.

The 4-aminostilbene-2'-methyl sulphone is obtained as follows:

32.4 parts of 4-nitrostilbene-2'-sulphonic acid chloride with a solution of 32 parts of sodium sulphite and 5 parts of sodium hydroxide in 200 parts of water are converted at 20–30° into the sodium salt of 4-nitrostilbene-2'-sulphinic acid. The sodium hydroxide is added over several hours in such a manner that the reaction mixture remains always weakly phenolphthalein alkaline. 31.1 parts of the sodium salt of 4-nitrostilbene-2'-sulphinic acid in 200 parts of xylene with 20 parts of dimethyl sulphate and 20 parts of magnesium oxide are stirred under reflux for 4–5 hours. The 4-nitrostilbene-2'-methyl sulphone obtained is a yellow powder which, when recrystallised from alcohol, melts at 147–149°. 30.3 parts of this 4-nitrostilbene-2'-methyl sulphone are reduced according to the Béchamp process with 30 parts of etched cast iron filings in a mixture of ethylene glycol monomethyl ether and water and 4-aminostilbene-2'-methyl sulphone is obtained as a yellow powder. Recrystallised from alcohol, it melts at 147–149°.

EXAMPLE 15

27.3 parts of 4-aminostilbene-4'-methyl sulphone are diazotised as described in Example 14 for 4-aminostilbene-2'-methyl sulphone. By coupling the diazo compound with 2-aminonaphthalene and oxidising the o-aminoazo dyestuff under the same condition as described in Example 14 to form the triazole compound, 2-(stilbyl-4'')-(naphtho-1'.2':4.5)-1.2.3-triazole-4'''-methyl sulphone is obtained as a yellowish powder which melts at 228–230°. The product is an excellent brightening agent for various polymeric synthetic materials such as polymerisates of vinyl chloride, vinylidene chloride, of copolymerisates, polystyrenes, polyethylenes, etc. as well as of fats, waxes and oils.

If the 4-aminostilbene-2'-methyl sulphone is replaced by 31.5 parts of 4-aminostilbene-4'-n-butyl sulphone, then 2 - (stilbyl - 4'') - (naphtho - 1'.2':4.5) - 1.2.3 - triazole - 4'''-n-butyl sulphone is obtained by coupling the diazo compound with 2-aminonaphthalene and oxidising to form the triazole compound. The product is a yellowish powder and has a similar action to that described above.

4′-aminostilbene-4′-methyl sulphone is obtained as follows:

18.4 parts of 4-methyl sulphonyl benzaldehyde are condensed for 4 hours at 150–160° with 18.3 parts of 4-nitrophenyl acetic acid and 2 parts of piperidine. 4-nitrostilbene-4′-methyl sulphone is obtained as a yellow powder. Recrystallised from glacial acetic acid it has a melting point of 235–237°. 30.3 parts of this 4-nitrostilbene-4′-methyl sulphone are reduced according to the Béchamp method in a mixture of ethylene glycol monomethyl ether and water. 4-aminostilbene-4′-methyl sulphone is a yellowish powder.

EXAMPLE 16

44.6 parts of 2-(stilbyl-4″)-(naphtho-1′.2′:4.5)-1.2.3-triazole-4‴-sulphonic acid chloride are added to an aqueous solution of 20 parts of dimethylamine at a temperature of 0–3° and stirred overnight at room temperature. The raw product is filtered off, washed with water, dissolved in hot dimethyl formamide, some animal charcoal is added and the filtrate obtained is poured into four or five times its volume of about a 10% sodium chloride solution. The precipitated product is filtered off, washed with water and dried in the vacuum. The 2-(stilbyl-4″)-(naphtho-1′.2′:4.5)-1.2.3-triazole-4‴-sulphonic acid dimethyl amide so obtained is a yellowish powder. This compound is an active brightening agent for fats, waxes, oils and various organic polymerisation products.

A product with a similar action is obtained if the dimethylamine is replaced by an aqueous solution of 25 parts of cyclohexylamine and the mixture is finally stirred for 1 hour at a temperature of 40–45°. By separating from the excess cyclohexylamine and purification of the product by recrystallisation, the 2-(stilbyl-4″)-(naphtho-1′.2′:4.5)-1.2.3-triazole-4‴-sulphonic acid cyclohexylamide is obtained as a yellowish powder.

Also the dimethylamine can be replaced by an aqueous solution of 22 parts of morpholine. 2-(stilbyl-4″)-(naphtho-1′.2′:4.5)-1.2.3-triazole-4‴-sulphonic acid morpholide is obtained as a yellowish powder. The product is an interesting brightening agent for polymeric synthetic materials such as polyvinyl chloride, polyvinylidene chloride, polyacrylonitrile and copolymers, etc.

The 2-(stilbyl-4″)-(naphtho-1′.2′:4.5)-1.2.3-triazole-4‴-sulphonic acid chloride named in the above example is obtained as follows: 160 parts of phosphorus pentachloride are added to 1000 parts of phosphorus oxychloride and then 226 parts of the sodium salt of 2-(stilbyl-4″)-(naphtho-1′.2′:4.5)-1.2.3-triazole-4‴-sulphonic acid, obtained by oxidation of the o-aminoazo dyestuff from the diazo compound from 4-aminostilbene-4′-sulphonic acid and 2-aminonaphthalene, are added in small portions within half an hour. The reaction mixture is stirred at a temperature of 102–105° for 3 hours and then poured, while stirring well, into 2000 parts of water and about 3000 parts of ice, this being done in such a way that the temperature does not exceed 5°. On complete decomposition of the phosphorus acid halides, the precipitated acid chloride is filtered off, washed well with cold water, and dried in the vacuum at 30–35° until the weight is constant. 2-(stilbyl-4″)-(naphtho-1′.2′:4.5)-1.2.3-triazole-4‴-sulphonic acid chloride is a yellowish powder.

EXAMPLE 17

44.6 parts of the 2-(stilbyl-4″)-(naphtho-1′.2′:4.5)-1.2.3-triazole-4‴-sulphonic acid chloride described in the last paragraph of Example 16 are added within half an hour at 60–65° to an aqueous solution of 10.5 parts of phenol and 5 parts of sodium hydroxide. The whole is stirred until completion of the reaction, the reaction being kept moderately phenolphthalein alkaline. The raw phenyl ester so obtained is filtered off after cooling, washed well with water and dried in the vacuum. The 2-(stilbyl-4″)-(naphtho-1′.2′:4.5)-1.2.3-triazole-4‴-sulphonic acid phenyl ester is obtained as a yellowish powder by recrystallisation from hot chlorobenzene. This compound can be used for the brightening of the most varied organic substances, of which can be named: waxes, fats, and oils as well as polymeric synthetic materials such as polyvinyl chloride, polyvinylidene chloride, polyacrylonitrile, copolymers, polystyrenes, polyacrylic acid esters, etc.

A product with a very similar action is obtained if in the above example the phenol is replaced by 12 parts of p-cresol. 2-(stilbyl-4″)-(naphtho-1′.2′:4.5)-1.2.3-triazole-4‴-sulphonic acid-p-cresyl ester is obtained as a yellowish powder.

If in the above example the phenol is replaced by 17 parts of p-tert. butyl phenol, then 2-(stilbyl-4″)-(naphtho-1′.2′:4.5)-1.2.3-triazole-4‴-sulphonic acid-p-tert. butylphenyl ester is obtained.

This compound is a yellowish powder. The product is soluble in many organic solvents and when so dissolved has a strong fluorescence. It can be used for the brightening of the most different organic synthetic materials such as polyvinyl chloride, polyacrylonitrile, copolymers, etc.

EXAMPLE 18

0.025 part of 2-(stilbyl-4″)-(naphtho-1′.2′:4.5)-1.2.3-triazole-2″-sulphonic acid phenyl ester obtained according to Example 1 is stirred in 50 parts of dioctyl phthalate and then 100 parts of polyvinyl chloride powder and 2 parts of di-n-butyl dilauroyl-dioxystannate and 0.3 part of a product of the probable constitution of the sodium salt of penta-octyltripolyphosphate are mixed in. The homogeneous mixture of these products is then gelatinised in a hot mixing mill at 150–160° for 15 minutes and then milled to form sheets. The polyvinyl chloride sheets thus produced have a considerably more white appearance in daylight than those produced in a similar manner without the addition of the brightening agent named. To produce opaque sheets, 10 parts of titanium dioxide (Anatase) are added to the mixture before milling. A considerably more white appearance in daylight can be determined when compared with opaque sheets without the addition of the triazole derivative named.

EXAMPLE 19

100 parts of polystyrene powder are homogeneously mixed in a mixing mill at 130° with 0.015 part of 2-(stilbyl-4″)-(naphtho-1′.2′:4.5)-1.2.3-triazole-2″-sulphonic acid cyclohexyl amide obtained according to Example 4. The hard disk obtained is broken up and the product is further processed in the injection moulding apparatus or by pressing. Contrasted with products not having the addition of the brightening agents named, these products have a considerably more white appearance in daylight.

EXAMPLE 20

0.005 part of 2-(stilbyl-4″)-(naphtho-1′.2′:4.5)-1.2.3-triazole-2″-sulphonic acid-di-n-butylamide obtained according to Example 3 is dissolved at a raised temperature in 0.5 part of stearic acid. The solution obtained is then added to a melted mass from which candles are to be made consisting of 70 parts of paraffin and 29.5 parts of stearic acid, and, after mixing well, the mixture is poured into moulds. The candles obtained, contrasted with those not having a content of triazole brightening agent, have a considerably more white appearance in daylight.

The following compounds can be produced according to the methods described in the Examples 1 to 17. These products have similar properties also.

Table 1

2-(STILBYL-4″)-(NAPHTHO-1′.2′:4.5)-1.2.3-TRIAZOLE-2″-SULPHONIC ACID DERIVATIVES

| | | |
|---|---|---|
| (4-octylphenol)-ester | yellow powder | M. P. 94–96°. |
| amide | pale yellowish powder | M. P. 163–165°. |
| n-octylamide | yellowish powder | M. P. 195–197°. |
| n-decylamide | ——do—— | M. P. 210–212°. |
| n-hexadecylamide | pale yellow powder | M. P. 170–172°. |
| n-octadecylamide | ——do—— | M. P. 185–187°. |
| diethylamino-ethylene amide | ——do—— | M. P. 173–174°. |
| dicyclohexylamide | pale yellowish powder | M. P. 257–260°. |
| (4′-amyl-diphenylether-2)-amide | yellowish powder | M. P. 172–174°. |
| (2-carboxyanilide) | pale yellowish powder | Decomposition over 300°. |
| (3-carboxyanilide) | ——do—— | Do. |
| (4-carboxyanilide) | yellowish powder | Do. |
| (4-glycolic acid ether anilide) | pale grey powder | Do. |
| (3-acrylic acid anilide) | pale yellowish powder | M. P. 228–230°. |
| (4-hydroxy-3-carboxyanilide) | brownish yellow powder | Decomposition over 300°. |
| (3-aminosulphonanilide) | pale yellow powder | M. P. 249–251°. |
| (4-aminosulphonanilide) | ——do—— | M. P. 260–262°. |
| α-naphthylamide | greenish yellow powder | M. P. 204–206°. |
| α-N-ethyl-naphthylamide | grey-greenish powder | M. P. 110–112°. |

Table 2

2-(STILBYL-4″)-(NAPHTHO-1′.2′:4.5)-1.2.3-TRIAZOLE-2″.5′-DISULPHONIC ACID DERIVATIVES

| | | |
|---|---|---|
| di-(4-n-octylphenol)-ester | pale yellowish powder | M. P. 124–126°. |
| di-amide | pale yellow powder | Decomposition at 205–210°. |
| di-dodecylamide | pale grey powder | M. P. 141–143°. |
| di-octadecylamide | pale grey-yellowish powder | M. P. 146–148°. |
| di-(2-carboxyanilide) | pale yellowish powder | Decomposition over 300°. |
| di-(3-carboxyanilide) | greyish-yellowish powder | Do. |
| di-(4-carboxyanilide) | grey-yellowish powder | Do. |

Table 3

2-(STILBYL-4″)-(NAPHTHO-1′.2′:4.5)-1.2.3-TRIAZOLE-2″.6′-DISULPHONIC ACID DERIVATIVES

| | | |
|---|---|---|
| di-α-naphthol ester | pale grey powder | M. P. 285–287°. |
| di-amide | green-yellowish powder | M. P. 230–232°. |
| di-ethylamide | pale yellow powder | M. P. 245–247°. |
| di-n-octylamide | ——do—— | M. P. 196–198°. |
| di-n-decylamide | yellowish powder | M. P. 286–288°. |
| di-hexadecylamide | brownish-yellowish powder | M. P. 210–212°. |
| di-n-octadecylamide | yellowish powder | M. P. 212–214°. |
| bis-diethanolamide | pale yellowish powder | M. P. 160–162°. |
| di-piperidide | pale brownish yellow powder | M. P. 286–288°. |
| di-morpholide | ——do—— | M. P. 248–250°. |
| di-(β-aminoethylene amide) | yellowish powder | M. P. 263–265°. |
| bis-diethylamino-ethylene-amide | weak orange-yellowish powder | M. P. 148–150°. |
| di-N-methyl-anilide | yellowish powder | M. P. 210–212°. |
| di-(4′-amyl-diphenylether-2)-amide | ——do—— | M. P. 80–82°. |
| di-(5-phenylsulphone-2-methyl)-anilide | olive-yellowish powder | M. P. 120–122°. |
| di-(3-aminosulphone-anilide) | pale yellow powder | M. P. 212–214°. |
| di-(4-aminosulphone-anilide) | ——do—— | M. P. 282–284°. |
| di-α-naphthylamide | pale grey powder | M. P. 164–166°. |
| di-α-N-ethyl-naphthylamide | yellow powder | M. P. 168–170°. |
| di-β-naphthylamide | brownish yellow powder | M. P. 248–250°. |

Table 4

2-(STILBYL-4″)-(NAPHTHO-1′.2′:4.5)-1.2.3-TRIAZOLE 2″.5′.7′-TRISULPHONIC ACID DERIVATIVES

| | | |
|---|---|---|
| triphenyl ester | yellow powder | M. P. 175–177°. |
| tri-β-naphthyl ester | pale brownish yellow powder | M. P. 298–300°. |
| tri-ethylamide | grey-brown powder | M. P. 161–164°. |
| tri-di-n-butylamide | brown-yellow resin | greasy. |
| tri-cyclohexylamide | pale yellow brownish powder | M. P. 126–128°. |
| trianilide | pale yellow powder | M. P. 276–278°. |
| tri-β-naphthylamide | yellow powder | M. P. 293–295°. |

Table 5

6-METHYL-5-METHOXY-2-(STILBYL-4′)-1.2.3-BENZTRIAZOLE-2′-SULPHONIC ACID DERIVATIVES

| | | |
|---|---|---|
| n-dodecylamide | yellow powder | M. P. 102–104°. |
| dicyclohexylamide | pale yellow powder | M. P. 304–306°. |

Table 6

5-ACETAMINO-2-(STILBYL-4′)-1.2.3-BENZTRIAZOLE-2′-SULPHONIC ACID DERIVATIVES

| | | |
|---|---|---|
| phenyl ester | brownish-yellow powder | M. P. 204–206°. |
| n-dodecylamide | browny-yellow powder | M. P. 165–167°. |
| cyclohexylamide | brownish-yellow powder | M. P. 192–194°. |
| 5-benzoylamino-2-(stilbyl-4′)-1.2.3-benztriazole-2′-sulphonic acid cyclohexylamide | ——do—— | M. P. 200–202°. |
| 2-(2‴-methoxy-stilbyl-4″)-(naphtho-1′.2′:4.5)-1.2.3-triazole-2″-sulphonic acid-di-n-butylamide | ——do—— | M. P. 138–140°. |
| 2-(2‴-methoxy-stilbyl-4″)-(naphtho-1′.2′:4.5)-1.2.3-triazole-2″-sulphonic acid cyclohexylamide | ——do—— | M. P. 84–86°. |
| 2-(2‴-methoxy-stilbyl-4″)-(naphtho-1′.2′:4.5)-1.2.3-triazole-2″-sulphonic acid dicyclohexylamide | yellow powder | M. P. 146–148°. |
| 2-(3‴-methoxy-stilbyl-4″)-(naphtho-1′.2′:4.5)-1.2.3-triazole-2″-sulphonic acid-di-n-butylamide | yellowish powder | M. P. 102–104°. |
| 2-(3‴-methoxy-stilbyl-4″)-(naphtho-1′.2′:4.5)-1.2.3-triazole-2″-sulphonic acid cyclohexylamide | pale yellow powder | M. P. 162–164°. |
| 2-(3‴.4‴-dihydroxy-methylene-stilbyl)-(naphtho-1′.2′:4.5)-1.2.3-triazole-2″-sulphonic acid dicyclohexylamide | yellow powder | M. P. 195–197°. |
| 2-(2‴.3‴-dimethoxy-stilbyl-4″)-(naphtho-1′.2′:4.5)-1.2.3-triazole-2″-sulphonic acid phenyl ester | ——do—— | |
| 2-(3‴.4‴-dimethoxy-stilbyl-4″)-(naphtho-1′.2′:4.5)-1.2.3-triazole-2″-sulphonic acid phenyl ester | ——do—— | |
| 6-chloro-5-methoxy-2-(stilbyl-4′)-1.2.3-benztriazole-2′-sulphonic acid cyclohexylamide | pale yellow powder | M. P. 190–192°. |
| 6-chloro-6-methoxy-2-(stilbyl-4′)-1.2.3-benztriazole-2′-sulphonic acid-di-n-butylamide | brownish-yellow powder | M. P. 146–148°. |
| 5.6-dimethoxy-2-(stilbyl-4′)-1.2.3-benztriazole-2′-sulphonic acid cyclohexylamide | pale yellow powder | M. P. 220–222°. |
| 5.6-dimethoxy-2-(stilbyl-4′)-1.2.3-benztriazole-2′-sulphonic acid-di-n-butylamide | brownish-yellow powder | M. P. 159–161°. |
| 2-[4‴-(naphtho-1′.2′:4.5-triazolyl-2)-stilbyl-4″]-(naphtho-1′.2′:4.5)-1.2.3-triazole-2″.2‴-disulphonic acid-bis-di-n-butylamide | yellow powder | M. P. 292–294°. |
| 2-[4‴-(naphtho-1′.2′:4.5-triazolyl-2)-stilbyl-4″]-(naphtho-1′.2′:4.5)-1.2.3-triazole-2″.2‴-disulphonic acid-bis-dodecylamide | orange yellow powder | M. P. 248–250°. |
| 2-[4‴-(naphtho-1′.2′:4.5-triazolyl-2)-stilbyl-4″]-(naphtho-1′.2′:4.5)-1.2.3-triazole-2″.2‴-disulphonic acid-bis-cyclohexylamide | yellow powder | M. P. over 300°. |
| 2-[4‴-(naphtho-1′.2′:4.5-triazolyl-2)-stilbyl-4″]-(naphtho-1′.2′:4.5)-1.2.3-triazole-2″.2‴-disulphonic acid-bis-morpholide | ——do—— | M. P. over 300°. |
| 2-[4‴-(naphtho-1′.2′:4.5-triazolyl-2)-stilbyl-4″]-(naphtho-1′.2′:4.5)-1.2.3-triazole-2″.2‴-disulphonic acid-bis-piperidide | brownish-yellow powder | M. P. over 300°. |

The last 5 above named compounds are particularly suitable for the brightening of polystyrenes.

What we claim is:

1. A stilbyl triazole compound which corresponds to the formula

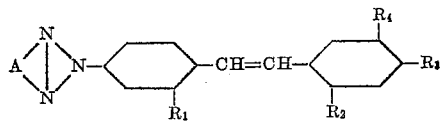

wherein A represents a member selected from the group consisting of aromatic radicals of the benzene and naphthalene series in which two vicinal carbon atoms are bound to the nitrogen atoms of the triazole ring; $R_1$ represents a member selected from the group consisting of H and $X-SO_2-$; $R_2$ represents a member selected from the group consisting of H, lower alkoxy and $X-SO_2-$; $R_3$ represents a member selected from the group consisting of H, lower alkoxy, phenoxy, naphthotriazolyl and $X-SO_2-$; $R_4$ represents a member selected from the group consisting of H and lower alkoxy; X is a member selected from the group consisting of lower alkyl, mononuclear carbocyclic aryl, amino, alkylamino, lower hydroxyalkylamino, lower aminoalkylamino, cyclohexylamino, piperidino, morpholino, naphthylamino, N-lower alkylphenylamino, N-lower alkylnaphthylamino, naphthyloxy and phenyloxy, the aromatic nuclei being free from chromophores, auxochromes and ionogenic substituents, and at least one and not more than two of $R_1$, $R_2$ and $R_3$ being $X-SO_2-$.

2. A compound of the formula:

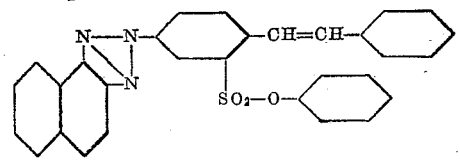

3. A compound of the formula:

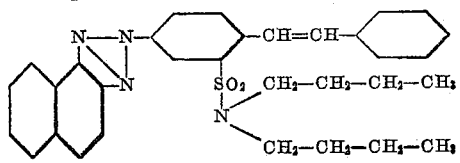

4. A compound of the formula:

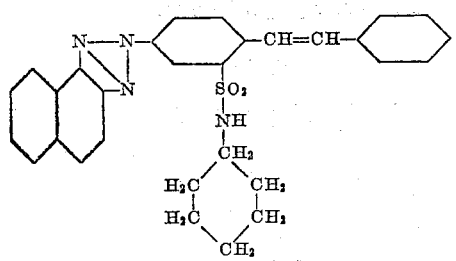

5. A compound of the formula:

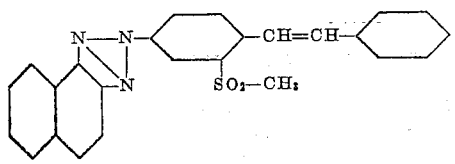

6. A compound of the formula:

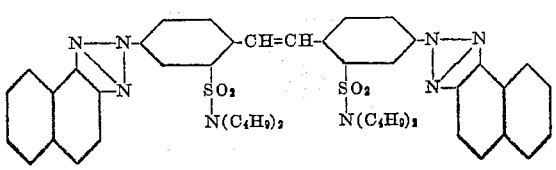

References Cited in the file of this patent
UNITED STATES PATENTS

| | | |
|---|---|---|
| 2,462,405 | Keller et al. | Feb. 22, 1949 |
| 2,467,262 | Knight | Apr. 12, 1949 |
| 2,668,777 | Gold et al. | Feb. 9, 1954 |
| 2,684,966 | Keller et al. | July 27, 1954 |
| 2,693,464 | Hanhart | Nov. 2, 1954 |

FOREIGN PATENTS

| | | |
|---|---|---|
| 176,531 | Austria | Oct. 26, 1953 |
| 229,350 | Switzerland | Jan. 17, 1944 |